(12) United States Patent
Sterns et al.

(10) Patent No.: US 9,998,421 B2
(45) Date of Patent: Jun. 12, 2018

(54) OPEN CHANNEL APPLICATION PROGRAMMING INTERFACE

(71) Applicant: Selligent, Inc., Redwood City, CA (US)

(72) Inventors: Jeremy Sterns, San Francisco, CA (US); Tulsi Ram Mayala, Redwood City, CA (US)

(73) Assignee: Selligent, Inc., Redwood City, CA (US)

( * ) Notice: Subject to any disclaimer, the term of this patent is extended or adjusted under 35 U.S.C. 154(b) by 60 days.

(21) Appl. No.: 14/735,702

(22) Filed: Jun. 10, 2015

(65) Prior Publication Data

US 2015/0358259 A1    Dec. 10, 2015

Related U.S. Application Data

(60) Provisional application No. 62/010,331, filed on Jun. 10, 2014.

(51) Int. Cl.
    *G06F 15/16* (2006.01)
    *H04L 12/58* (2006.01)

(52) U.S. Cl.
    CPC ............ *H04L 51/36* (2013.01); *H04L 51/066* (2013.01)

(58) Field of Classification Search
    CPC ........................................................ H04L 51/36
    USPC ................................................ 709/206, 203
    See application file for complete search history.

(56) References Cited

U.S. PATENT DOCUMENTS

| | | | |
|---|---|---|---|
| 8,438,476 B2 | 5/2013 | Uhlig et al. | |
| 8,886,735 B1 | 11/2014 | Liu et al. | |
| 8,935,344 B2 | 1/2015 | Mayala et al. | |
| 2002/0007400 A1* | 1/2002 | Pedersen | H04L 12/585 709/206 |
| 2002/0120697 A1 | 8/2002 | Generous et al. | |
| 2003/0018721 A1* | 1/2003 | Gupta | H04L 51/36 709/206 |
| 2003/0055907 A1* | 3/2003 | Stiers | H04L 67/2804 709/206 |
| 2005/0071434 A1* | 3/2005 | Hettish | H04L 51/066 709/207 |
| 2005/0198155 A1* | 9/2005 | Zakharoff | H04L 12/6418 709/206 |
| 2007/0083425 A1 | 4/2007 | Cousineau et al. | |
| 2007/0089053 A1 | 4/2007 | Uhlig et al. | |
| 2007/0174398 A1 | 7/2007 | Addante et al. | |
| 2008/0307103 A1* | 12/2008 | Marr | G06Q 30/02 709/231 |
| 2009/0089664 A1 | 4/2009 | Wagner et al. | |

(Continued)

*Primary Examiner* — Duyen Doan
(74) *Attorney, Agent, or Firm* — Crowell & Moring LLP (57) ABSTRACT

Systems and methods for distributing messages are described. In some embodiments, a server system includes one or more processors, and memory storing one or more programs for execution by the one or more processors. The system receives message distribution information, the message distribution information including a channel identifier and a message distribution address. The system receives from a message queue a plurality of messages that correspond to the channel identifier. The plurality of messages is for distribution to a plurality of users through one or more message distribution servers. The system processes the plurality of messages in accordance with the message distribution information; and sends a plurality of processed messages to the message distribution address for distribution to the plurality of users.

20 Claims, 5 Drawing Sheets

(56) References Cited

U.S. PATENT DOCUMENTS

| | | | |
|---|---|---|---|
| 2012/0167233 A1* | 6/2012 | Gillum | H04L 51/12 726/29 |
| 2013/0046781 A1 | 2/2013 | Frankel et al. | |
| 2013/0080911 A1 | 3/2013 | Klemm et al. | |
| 2013/0282837 A1 | 10/2013 | Mayala et al. | |
| 2015/0149560 A1* | 5/2015 | Lee | H04L 51/066 709/206 |
| 2015/0358258 A1 | 12/2015 | Mayala et al. | |

* cited by examiner

OPEN CHANNEL APPLICATION PROGRAMMING INTERFACE

CROSS REFERENCE TO RELATED APPLICATIONS

This application claims priority to U.S. Provisional Patent Application Ser. No. 62/010,331, filed Jun. 10, 2014, entitled "Open Channel Application Programming Interface," which is incorporated by reference herein in its entirety.

This application is related to U.S. patent application Ser. No. 13/451,458, filed Apr. 19, 2012, entitled "Systems and Methods for Message Personalization," which is incorporated by reference herein in its entirety.

TECHNICAL FIELD

This application relates generally to efficient distribution of personalized messages, and in particular, to computer systems and methods for efficient processing and sending of personalized interactive digital messages.

BACKGROUND

Smart phones have become widely popular in the recent years. Smart phones are capable of providing messages in multiple modalities, such as a text message (also called a SMS message) and an email. Smart phones typically include mobile applications (software applications) that have messaging capabilities (e.g., notifications and in-app messages).

The increased number of communication modalities has created expanded opportunities for marketers to communicate with users. However, modifying a marketing message server to work with an ever-increasing number of different modalities (e.g., new mobile applications, new messaging services, etc.) can be time-consuming and inefficient.

SUMMARY

The present disclosure addresses many of the shortcomings and drawbacks found in the prior art.

In accordance with some embodiments, a method is performed at a server system with one or more processors and memory. The method includes receiving message distribution information, the message distribution information including a channel identifier and a message distribution address. The method also includes obtaining from one or more message queues a plurality of messages that correspond to the channel identifier. The plurality of messages is for distribution to a plurality of users through one or more message distribution servers. The method further includes processing the plurality of messages in accordance with the message distribution information and sending a plurality of processed messages to the message distribution address for distribution to the plurality of users through the one or more message distribution servers.

In accordance with some embodiments, a server system includes one or more processors and memory storing one or more programs for execution by the one or more processors. The one or more programs include instructions for receiving message distribution information, the message distribution information including a channel identifier and a message distribution address. The one or more programs also include instructions for obtaining from one or more message queues a plurality of messages that correspond to the channel identifier. The plurality of messages is for distribution to a plurality of users through one or more message distribution servers. The one or more programs further include instructions for processing the plurality of messages in accordance with the message distribution information and sending a plurality of processed messages to the message distribution address for distribution to the plurality of users through the one or more message distribution servers.

In accordance with some embodiments, a non-transitory computer readable storage medium stores one or more programs for execution by one or more processors of a server system. The one or more programs include instructions for receiving message distribution information, the message distribution information including a channel identifier and a message distribution address. The one or more programs also include instructions for obtaining from one or more message queues a plurality of messages that correspond to the channel identifier. The plurality of messages is for distribution to a plurality of users through one or more message distribution servers. The one or more programs further include instructions for processing the plurality of messages in accordance with the message distribution information and sending a plurality of processed messages to the message distribution address for distribution to the plurality of users through the one or more message distribution servers.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

This application relates generally to efficient distribution of messages, and in particular, to computer systems and methods for efficient processing and sending of digital messages.

Figure 1:
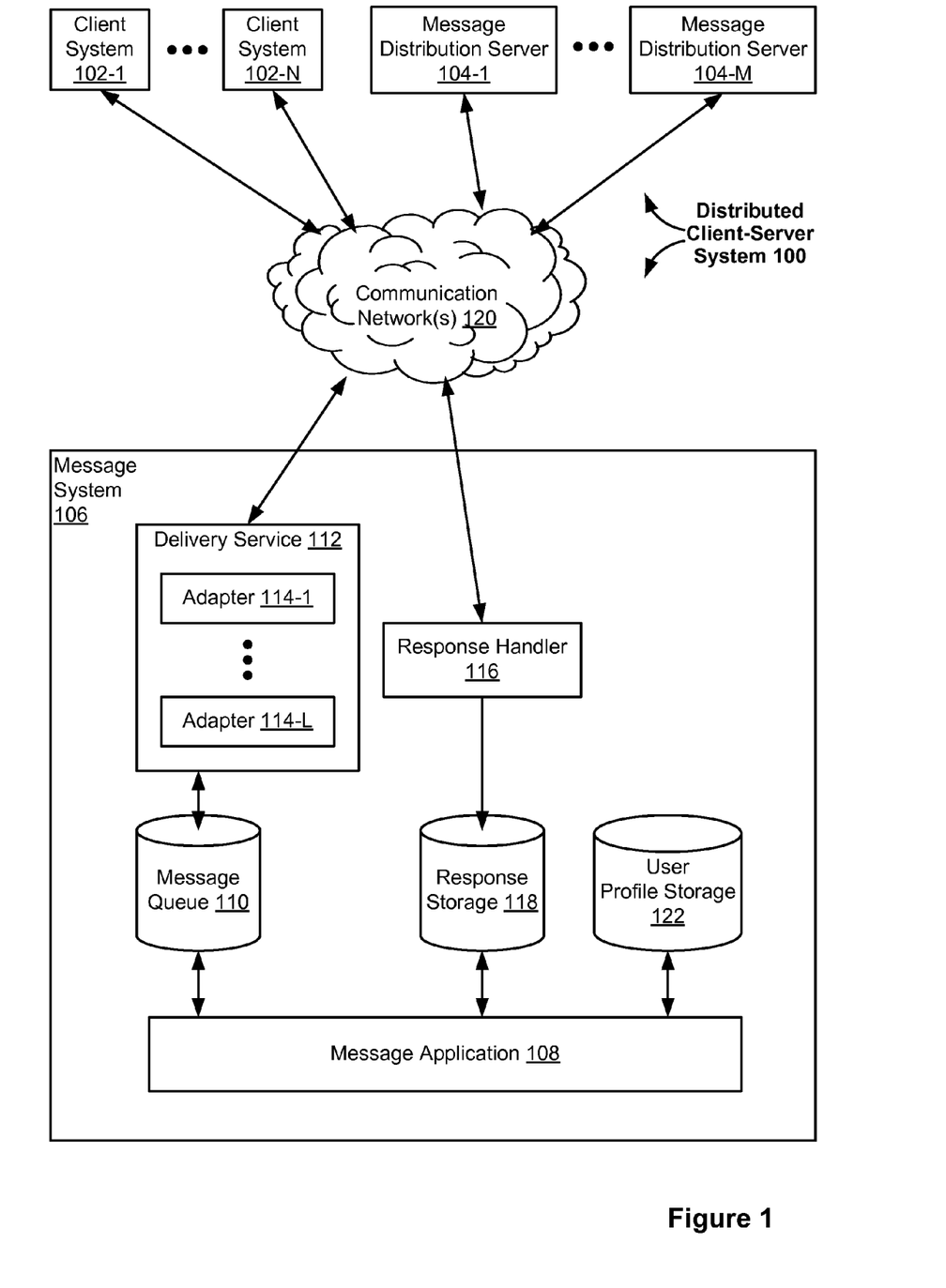
FIG. 1 is a block diagram illustrating a distributed computer system in accordance with some embodiments.

FIG. 1 is a block diagram illustrating a distributed computer system 100 in accordance with some embodiments. In FIG. 1, system 100 includes a plurality of client systems 102 (e.g., client system 102-1 through client system 102-N), one or more message distribution servers 104 (e.g., message distribution server 104-1 through message distribution server 104-M), a message system 106, and communication networks 120. Various embodiments of the message system 106 implement the methods described in this application.

A client system 102 can be any computing device (e.g., a laptop computer, a desktop computer, a mobile phone, a handheld computer, etc). The client system 102 typically includes a graphical user interface (GUI) for graphically displaying received messages. The client system 102 is connected to the message distribution server 104 and/or the message system 106 via communication networks 120.

A message distribution server 104 is a computer server configured to distribute messages. In some embodiments, the message distribution server 104 includes an electronic mail server configured to distribute electronic mails using a predefined protocol (e.g., Simple Mail Transfer Protocol (SMTP), Post Office Protocol (POP) in various versions, Internet Message Access Protocol (IMAP), X.400 International Telecommunication Union standard (X.400), Novell message Handling Service (MHS), and Extended Simple Mail Transfer Protocol (ESMTP), etc.). In some embodiments, the message distribution server 104 is configured to transfer messages via one or more predetermined protocols (e.g., Hypertext Transfer Protocol). In some embodiments, the message distribution server 104 is configured to distribute E-mail messages, instant messages, short message service (SMS) messages, multimedia message service (MMS) messages, text messages, chat room messages, mobile text messages, or other forms of electronic messages.

A message system 106 includes one or more servers connected to the communication networks 120. The message system 106 includes a delivery service 112 for sending messages in a message queue 110. In some embodiments, the message system 106 also includes a response handler 116 for receiving responses.

In some embodiments, the message system 106 initiates a message campaign by receiving personalized messages from a message application 108. The personalized messages are stored in the message queue 110. The delivery service 112 retrieves the personalized messages from the message queue 110 and processes them using one or more adapters 114 (e.g., Adapter 114-1 through Adapter 114-L). The processed messages are sent through the communication networks 120 to one or more message distribution servers 104 (e.g., Message Distribution Server 104-1 through Message Distribution Server 104-M). The one or more message distribution servers 104 distribute the processed messages to one or more client systems 102 through the communication networks 120.

In some embodiments, the one or more client systems 102 send feedback data that is indicative of user interactions with the received messages. In some embodiments, the feedback data is sent directly from the one or more client systems 102 to the message system 106 through the communication networks 120. In some embodiments, the feedback data is sent from the one or more client systems 102 to one or more distribution servers 104, which forward the feedback data to the message system 106.

Figure 2:
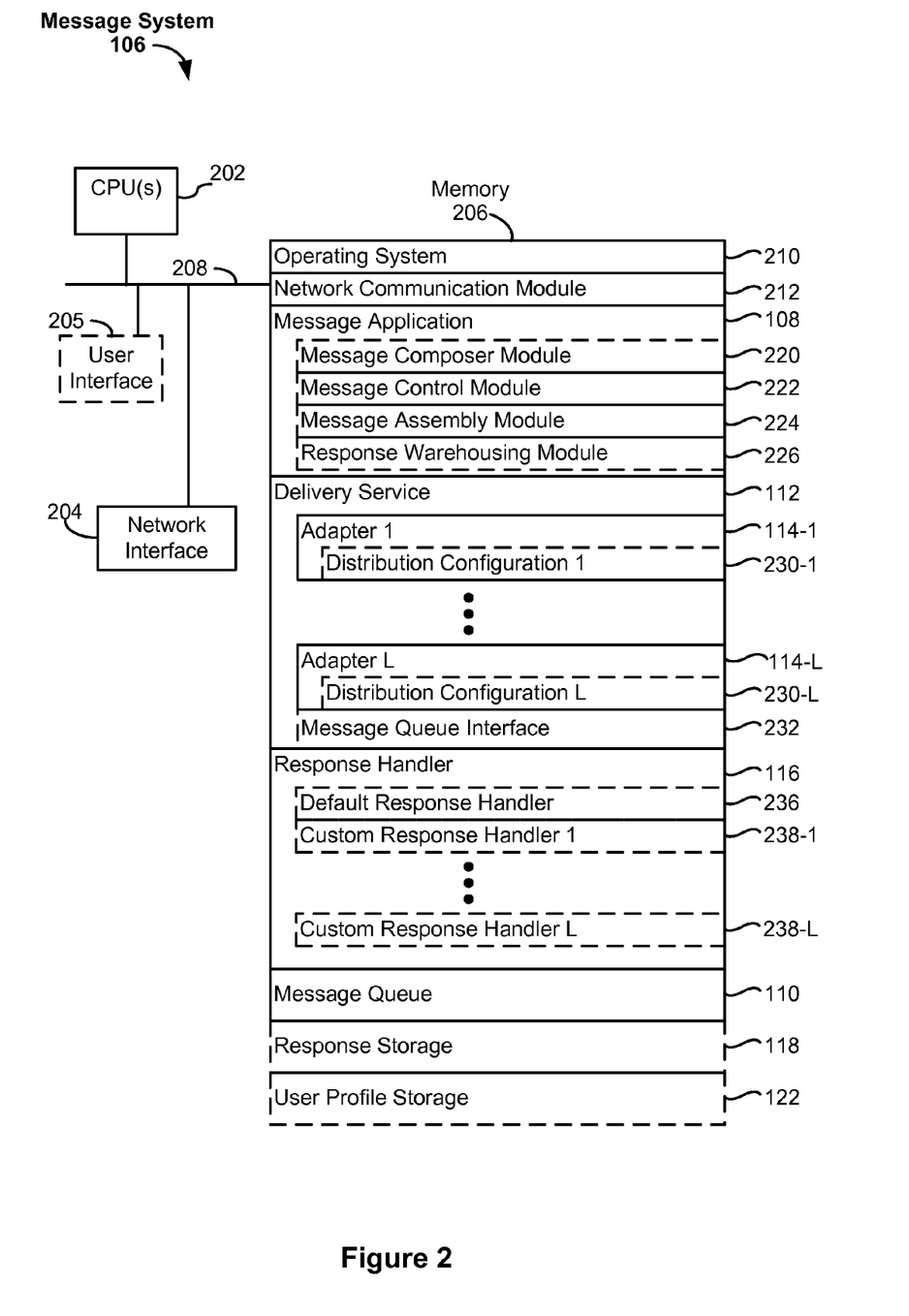
FIG. 2 is a block diagram illustrating a message system in accordance with some embodiments.

In some embodiments, the message system 106 also includes a response storage 118 and a user profile storage 122, which are described in detail with respect to FIG. 2.

FIG. 2 is a block diagram illustrating a message system 106 in accordance with some embodiments. The message system 106 includes one or more processing units CPU(s) 202, one or more network or other communication interfaces 204, memory 206, and one or more communication buses 208 for interconnecting these components. In some embodiments, the message system 106 includes a user interface 205 comprising a display device and one or more input devices, such as a keyboard, mouse, touchpad, touch screen and/or other input devices. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within memory 206, comprises a non-transitory computer readable storage medium. In some embodiments, memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212, configured for connecting the message system 106 to other computers (e.g., message distribution server 104, client system 102, etc.) via one or more network interfaces 204 (wired or wireless) and one or more communication networks 120 (FIG. 1), such as the Internet, other wide area networks, local area networks, metropolitan area networks, and so on;
- Message Application 108 configured for controlling a message campaign, optionally including preparing a message campaign, generating a plurality of personalized messages, and managing responses to the message campaign;
- Delivery Service 112 configured for processing and sending the plurality of personalized messages using a selected adapter (e.g., adapter 114-1);
- Response Handler 234 configured for processing responses from client systems 102 (FIG. 1), such as formatting and/or parsing the received responses; and
- Message Queue 110 configured for storing a plurality of messages for retrieval by the delivery service 112.

In some embodiments, the message application 108 includes one or more of:

- Message Composer Module 220 configured for composing campaign messages (e.g., templates) based on user inputs;
- Message Control Module 222 configured for controlling message campaigns;
- Message Assembly Module 224 configured for personalizing the campaign messages (e.g., inserting personal information to the templates); and
- Response Warehousing Module 226 configured for storing and managing responses received by the message system 106.

Although not shown in FIG. 2, in some embodiments, the message application 108 includes an analysis module for aggregating, analyzing and presenting the responses received by the message system 106.

In some embodiments, the delivery service 112 includes a plurality of adapters (e.g., adapter 1 (114-1) through adapter L (114-L)). In some embodiments, a respective adapter includes a unique message distribution configuration. FIG. 2 illustrates that the adapter 1 (114-1) includes a message distribution configuration 1 (230-1), and the adapter L (114-L) includes a message distribution configuration L (230-L). In some embodiments, a message distribution configuration includes information identifying how a message should be converted (e.g., a format of a processed message). In some embodiments, the message distribution configuration includes information to be inserted into a processed message (e.g., a header, a device or user identifier, a security token, and/or other metadata).

In some embodiments, the plurality of adapters is coupled to the delivery service 112 through an open channel application programming interface (API). This allows the message system 106 to work with various adapters without having to modify its internal structure, thereby enabling an efficient integration with various message distribution servers 104 (FIG. 1). For example, a system administrator who wants to integrate the message system 106 to work with a particular message distribution server 104 needs to provide an adapter configured to work with the open channel API without having to modify internal operations of the delivery service 112. This can be particularly useful when a communication between the delivery service 112 and the particular message distribution server 104 is based on a proprietary and/or secure communication protocol, because the system administrator need not disclose the communication protocol to others (e.g., the developers of the message system 106), thereby maintaining confidentiality of how the communication protocol operates.

In some embodiments, the delivery service 112 is configured for sending a plurality of processed messages using one or more predefined protocols (e.g., Hypertext Transfer Protocol, etc.).

In some embodiments, the delivery service 112 includes a message queue interface 232 configured for retrieving messages from the message queue 110.

In some embodiments, the response handler 116 includes one or more of:
Default Response Handler 236 configured for processing responses in accordance with a default response handling rule; and
One or more custom response handlers (e.g., Custom Response Handler 1 (238-1) through Custom Response Handler L (238-L)).

In some embodiments, a respective custom response handler includes a unique response configuration. For example, the custom response handler 1 (238-1) includes a response configuration 1, and the custom response handler L (238-L) includes a response configuration L (not shown). In some embodiments, each response configuration includes information identifying how a response should be parsed (e.g., what fields of information each response includes). In some embodiments, the response configuration includes metadata (e.g., a security token and/or other metadata that can be used to authenticate the response).

In some embodiments, the message queue 110 is configured for temporarily storing the plurality of messages. For example, the message queue 110 may store a plurality of messages for a predefined time (e.g., 1 hour, 2 hours, 3 hours, 6 hours, 12 hours, 24 hours, 2 days, 3 days, 5 days, 7 days, etc.).

In some embodiments, the memory 206 also includes the user profile storage 122, including one or more profiles for one or more users. In some embodiments, a respective user profile includes a unique user identifier that is used to associate sensitive information such as personally identifiable information in the user profile with information corresponding to the user. In some embodiments, the respective user profile includes a name of the user for use in personalizing messages in a message campaign. In some embodiments, the respective user profile includes contact information such as an email address, phone number, social network identifier, or the like, for addressing messages to the user as part of a message campaign. In some embodiments, the respective user profile includes user demographics for the user (e.g., age, geographic location, income level, gender, ethnicity, etc.) for determining a grouping of the user for analysis purposes. In some embodiments, the respective user profile includes user preferences/settings/status for personalizing messages sent to the user in a message campaign and/or selecting messages to deliver to the user as part of message campaigns.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 206 stores a subset of the modules and data structures identified above. Furthermore, in some embodiments, memory 206 stores additional modules and data structures not described above.

Although FIG. 2 shows the Message System 106 in accordance with some embodiments, FIG. 2 is intended more as functional description of the various features which may be present in a set of servers than as a structural schematic of the embodiments described herein. In practice, and as recognized by those of ordinary skill in the art, items shown separately could be combined and some items could be separated. For example, the message composer module 220 and the message control module 222 may be combined in a single module.

Some items shown separately in FIG. 2 could be implemented on single servers and single items could be implemented by one or more servers. For example, in some embodiments, the message application 108, the delivery service 112, and the response handler 116 are implemented in separate servers. In some embodiments, the message composer module 220, the message control module 222, the message assembly module 224, and the response warehousing module 226 are implemented on separate servers. In some embodiments, the message queue 110 is implemented in a server separate from the message application 108 and the delivery service 112. In some embodiments, the response storage 118 is implemented in a server separate from the response handler 116 and the message application 108. The actual number of servers used to implement the Message System 106 and how features are allocated among them will vary from one implementation to another, and optionally depends in part on the amount of data traffic that the system must handle during peak usage periods as well as during average usage periods.

Figure 3:
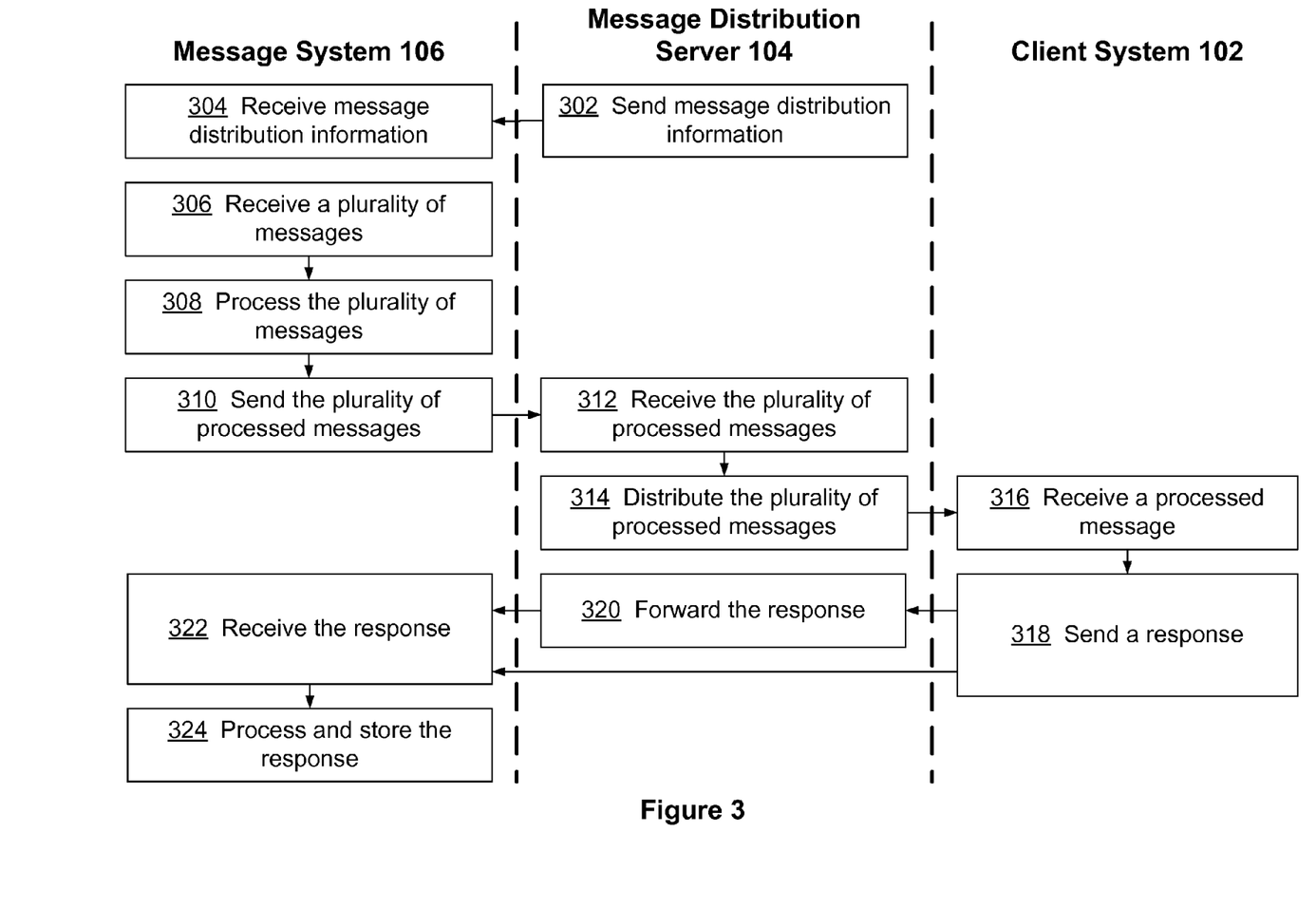
FIG. 3 is a flowchart illustrating communications between a message system, a message distribution system, and a client system in accordance with some embodiments.

FIG. 3 is a flowchart illustrating operations performed by the distributed computing system 100 (FIG. 1) including the message system 106, the message distribution system 104, and the client system 102 in accordance with some embodiments.

In some embodiments, the message distribution server 104 sends (302) message distribution information to the message system 106, and the message system 106 receives (304) the message distribution information. In some embodiments, the message distribution information includes a message distribution configuration (e.g., Distribution Configuration 230, FIG. 2) that corresponds to the message distribution system 104. In some embodiments, the message distribution information includes a custom response handler (e.g., instructions, which, when executed by one or more processors, provide the functionality of a custom response handler) or information to be used by a custom response handler (e.g., Custom Response Handler 238, FIG. 2).

The message system 106 receives (306) a plurality of messages (e.g., from the message queue 110, FIG. 1), processes (308) the plurality of messages (e.g., using the message distribution configuration), and sends (310) the plurality of processed messages to the message distribution server 104. In some embodiments, processing the plurality of messages includes inserting predefined information in the message distribution information. In some embodiments, processing the plurality of messages includes changing a format of the plurality of messages (e.g., from a text format to the Hypertext Markup Language (HTML) format).

The message distribution server 104 receives (312) the plurality of processed messages, and distributes (314) the plurality of processed messages to respective client systems. As a result, the client system 102 receives (316) a processed message. The processed message is typically personalized for the client system 102 (or a user of the client system 102) and not for any other client system.

In some embodiments, a user interaction with the processed message at the client system 102 is sent (318) as a response to the processed message. In an example, information indicating whether the user of the client system 102 has opened, clicked, or viewed the processed message is sent. In another example, whether the user has forwarded or shared the processed message, or whether the user has subscribed to, or unsubscribed from, a mailing list identified in the processed message is sent.

In some embodiments, the response is sent directly from the client system 102 to the message system 106. In some embodiments, the response is sent from the client system 102 to the message distribution server 104, and the message distribution server 104 forwards (320) the response to the message system 106.

The message system 106 receives (322) the response, processes (324) the response, and stores (324) the processed response. In some embodiments, the response is parsed using the custom response handler.

In some embodiments, a plurality of responses is processed and analyzed, and a result is presented in the message application 108 (FIG. 1). For example, a percentage of desired responses (e.g., a user sharing or subscribing to the message) may be presented.

Figure 4A:
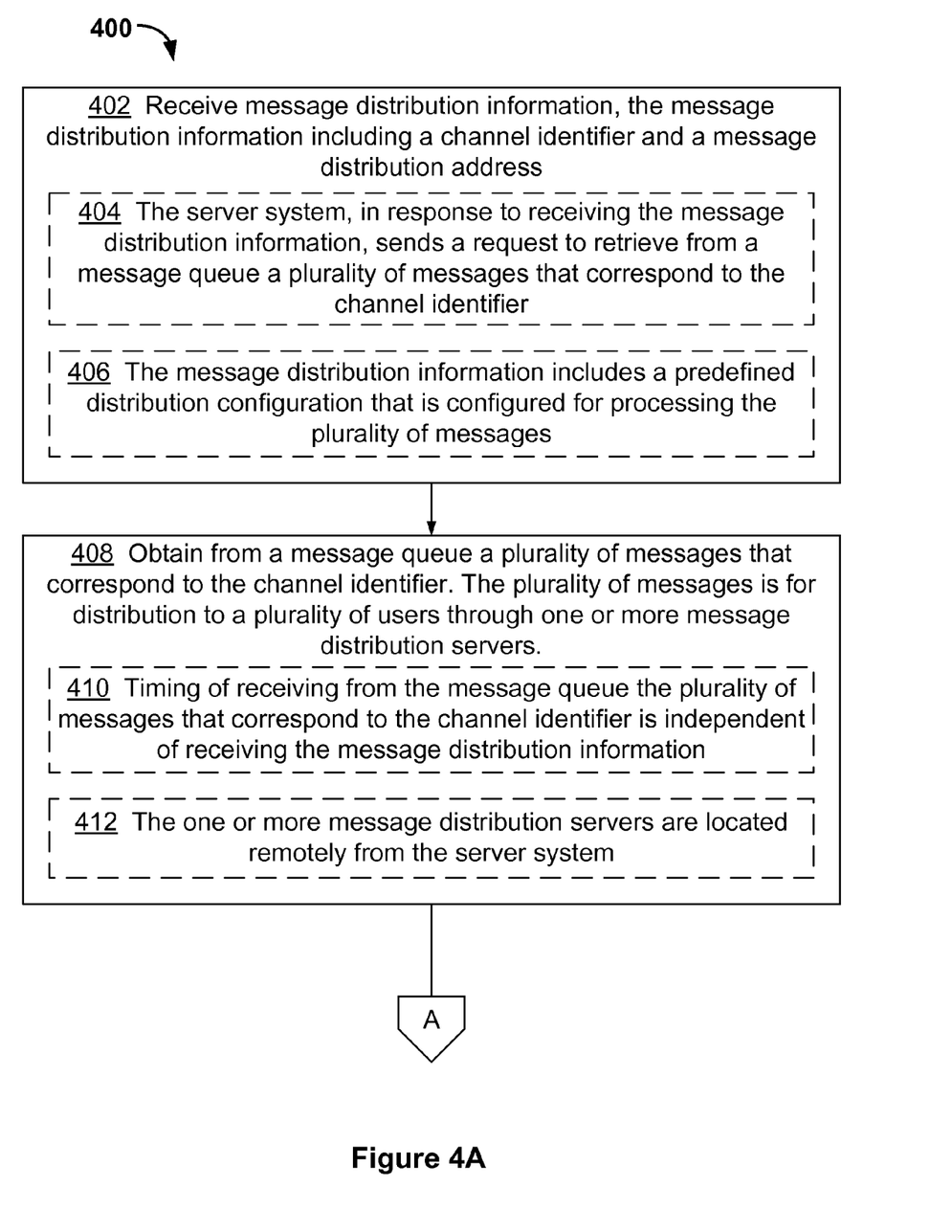
FIG. 4A and FIG. 4B are flowcharts illustrating a method of processing messages for distribution in accordance with some embodiments.
Figure 4B:
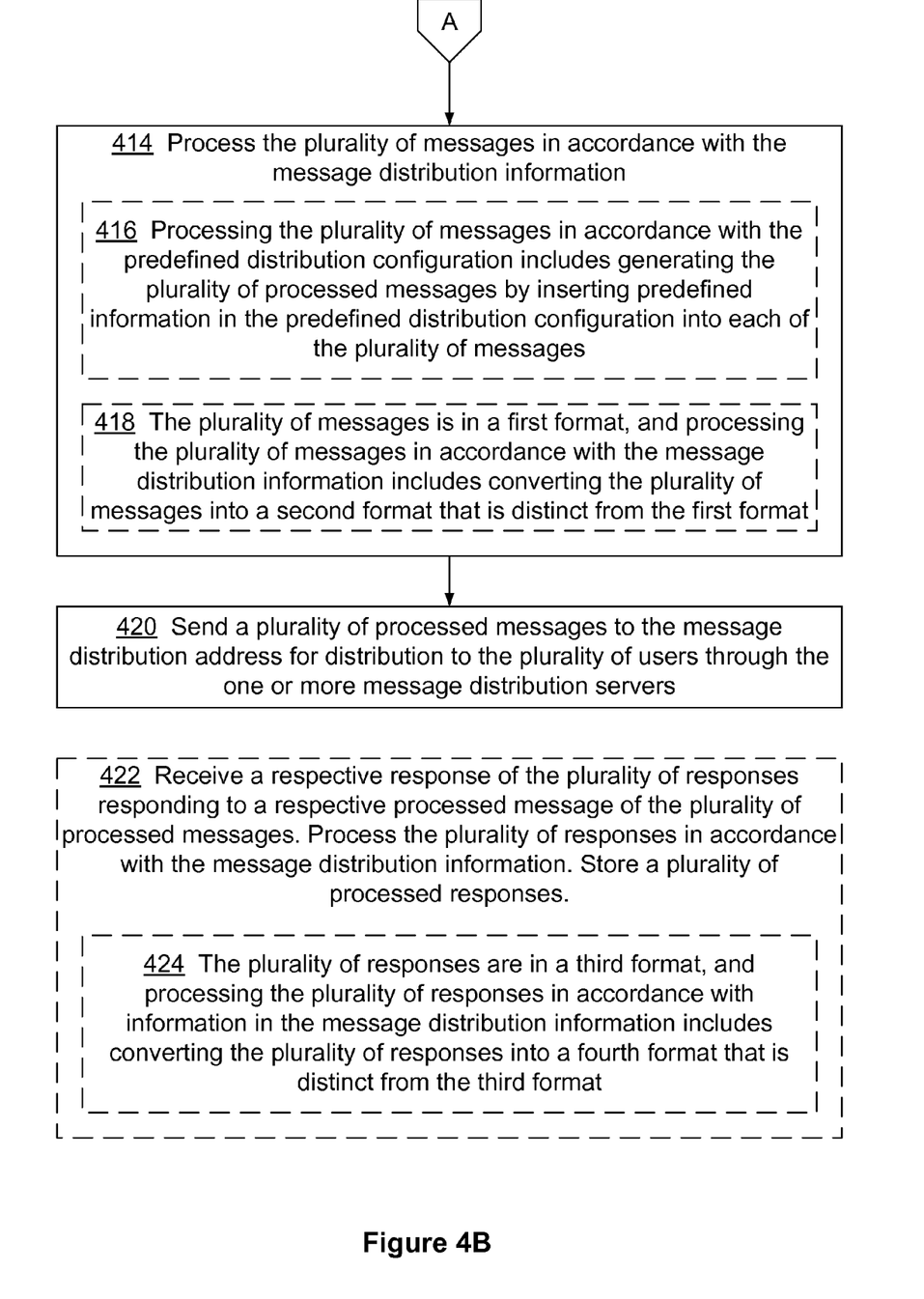

FIGS. 4A-4B are flowcharts illustrating a method 400 of processing messages for distribution in accordance with some embodiments. The method 400 is performed at a server system (e.g., the message system 106, FIG. 1) with one or more processors and memory. In some embodiments, each of the operations shown in FIGS. 4A-4B corresponds to instructions stored in a computer memory or non-transitory computer readable storage medium (e.g., memory 206 of the message system 106 in FIG. 2). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in the method 400 are, optionally, combined and/or the order of some operations is, optionally, changed.

The server system receives (402) message distribution information. The message distribution information includes a channel identifier and a message distribution address. A channel identifier typically identifies a channel to be used for distributing messages (e.g., electronic mail (e-mail), short message service (SMS), micro-blogging service, and one or more mobile applications). In some embodiments, the channel identifier is selected from a group comprising electronic mail (e-mail), short message service (SMS), micro-blogging service, and one or more mobile applications (e.g., a proprietary mobile application). In some embodiments, the message distribution address is an HTTP distribution URL (to which corresponding messages are sent). The HTTP distribution URL typically includes a domain name or a corresponding Internet Protocol address (IP address). In some embodiments, the HTTP distribution URL includes a port number. Typically, a channel identifier is independent of a subject matter included in messages.

In some embodiments, the message distribution information includes a predefined distribution configuration (e.g., Adapter 1 (114-1), FIG. 1 or Distribution Configuration 1 (230-1), FIG. 2). In some embodiments, the message distribution information includes a custom response handler (e.g., Custom Response Handler 1 (238-1), FIG. 2) or a predefined response configuration.

In some embodiments, the server system receives the message distribution information from a particular message distribution server (e.g., Message Distribution Server 104-1, FIG. 1). For example, the particular message distribution server may be a SMS server, an email server, a micro-blogging server, or a mobile application messaging server. In some embodiments, the predefined distribution configuration corresponds to the particular message distribution server. In other words, in some embodiments, there is a one-to-one relationship between a particular message distribution server and a predefined distribution configuration. In fact, in some instances, the predefined distribution configuration corresponds exclusively to the particular message distribution server (e.g., the predefined distribution configuration is not compatible with any message distribution server other than the particular message distribution server). In case the message distribution information includes a custom response handler or a predefined response configuration, the custom response handler or the predefined response configuration in the message distribution information corresponds to the particular message distribution server. In some embodiments, there is a many-to-one relationship between message distribution servers and a particular adapter 114 such that the particular adapter may handle message distribution information from any one or any combination of a plurality of message distribution servers 104.

Reciprocally, in some embodiments, there is a one-to-many relationship between a particular message distribution server and a plurality of adapters such that the particular message distribution server may send message distribution information to any one of a plurality of adapters. Such embodiments may be employed, for example, to scale to large volumes of message distribution information intended for a particular channel. Thus, typically, in such embodiments, each adapter that is capable of receiving message distribution information of a certain form is an exact clone running on, for example, a different thread or a different computer.

Depending on traffic volume, in some embodiments, there is a many-to-many relationship between a message distribution servers and a plurality of adapters such that any any one of an enumerated number of the particular message distribution servers may send message distribution information to any one of a number of adapters. Such embodiments may be employed, for example, to scale to large volumes of message distribution information. Thus, typically, in such embodiments, each adapter that is capable of receiving message distribution information of a certain form is an exact clone running on, for example, a different thread or different computer.

In some embodiments, the server system, in response to receiving the message distribution information, sends (404) a request to retrieve from the message queue the plurality of messages that correspond to the channel identifier. The message queue receives the request, and in response to receiving the request, the message queue sends to the server system the plurality of messages that correspond to the channel identifier.

In some embodiments, messages in the plurality of messages have not been previously received by the server system. In some embodiments, no message in the plurality of messages has been previously received by the server system. In some embodiments, messages in the plurality of messages have not been previously sent to the message distribution address. In some embodiments, no message in the plurality of messages has been previously sent to the message distribution address.

In some embodiments, the message distribution information includes (406) a predefined distribution configuration (e.g., Adapter 1 (114-1) or Distribution Configuration 1 (230-1), FIG. 1) that is configured for processing the plurality of messages. In some embodiments, the message distribution information includes instructions for converting the plurality of messages (e.g., a format of a converted message). In some embodiments, the message distribution information includes information to be inserted into the plurality of messages (e.g., a header, a device or user identifier, a security token, and/or other metadata).

The server system obtains (408) from a message queue (e.g., Message Queue 110, FIG. 1) a plurality of messages that correspond to the channel identifier. For example, each message in the message queue is associated with a respective channel identifier (e.g., a mobile application, e-mail or SMS). In some embodiments, a message is associated with a channel identifier by the message application 108 (FIG. 1). Thus, for distribution to a message distribution server that corresponds to the channel identifier, the server system receives from the message queue only messages that correspond to the channel identifier. The plurality of messages is for distribution to a plurality of users through one or more message distribution servers.

In some embodiments, obtaining from the message queue the plurality of messages includes retrieving from the message queue the plurality of messages. For example, when the server system includes the message queue, the server system retrieves the plurality of messages from the message queue.

In some embodiments, obtaining from the message queue the plurality of messages includes receiving from the message queue the plurality of messages. For example, when the message queue is located outside the server system, the server system receives the plurality of messages from the message queue.

In some embodiments, a timing of obtaining from the message queue the plurality of messages that correspond to the channel identifier is (410) independent of receiving the message distribution information. For example, the server system need not receive (or retrieve) the plurality of messages from the message queue in response to receiving the message distribution information. In some embodiments, the plurality of messages is received in accordance with a predefined time interval (e.g., every 15 minutes, 30 minutes, 60 minutes, 2 hours, 3 hours, 6 hours, 12 hours, 24 hours, etc.). In some embodiments, the timing of obtaining the plurality of messages from the message queue is based on timing of receiving the plurality of messages in the message queue. For example, in some embodiments, the plurality of messages from the message queue is received as soon as the plurality of messages is queued in the message queued.

In some embodiments, the one or more message distribution servers are (412) located remotely from the server system. For example, at least one of the one or more message distribution servers is at a physical location distinct from a physical location of the server system (e.g., different enclosures, different rooms, different buildings, different geographic locations, etc.).

The server system processes (414) the plurality of messages in accordance with the message distribution information. In some embodiments, processing the plurality of messages includes inserting recipient attributes (e.g., mobile numbers, twitter handles, home addresses, etc.). In some embodiments, processing the plurality of messages includes converting the plurality of messages into a different format. In some embodiments, processing the plurality of messages includes inserting metadata (e.g., a header, a device or user identifier, a security token, and/or other metadata).

In some embodiments, processing the plurality of messages in accordance with the predefined distribution configuration includes (416) generating the plurality of processed messages by inserting predefined information in the predefined distribution configuration into each of the plurality of messages. In some embodiments, the predefined information includes metadata (e.g., a header, a device or user identifier, a security token, and/or other metadata). In some embodiments, the security token is a predefined length of a string that includes numbers and/or non-numeric characters (e.g., alphabets and special characters). The security token is used by a message distribution server to authenticate messages sent by the server system. In some embodiments, the metadata includes one or more of: a message identifier, a message timestamp, a message priority, a message size, a mailing identifier, a recipient identification, a template identifier, a target identifier, and a message type identifier. In some embodiments, the message identifier uniquely identifies a message that includes the message identifier. In some embodiments, the message priority is selected from a group consisting of urgent, high, normal, and low. In some embodiments, the template identifier uniquely identifies a template used for preparing a message that includes the template identifier.

In some embodiments, the plurality of messages is (418) in a first format, and processing the plurality of messages in accordance with the message distribution information includes converting the plurality of messages into a second format that is distinct from the first format. In some embodiments, the second format is one of: HTML, text, SMS, and push notification. For example, the first format is text and the second format is HTML. In another example, the first format is HTML and the second format is SMS.

In some embodiments, the second format identifies information to be included in a processed message. As a result, in some embodiments the server system foregoes including, in a processed message, particular information in a message so that the processed message does not include the particular information in the message. For example, when an obtained message includes a date and the second format does not identify a date as a type of information to be included in a processed message, the server system omits the date in generating the processed message (e.g., the date is not included in the processed message).

The server system sends (420) a plurality of processed messages to the message distribution address for distribution to the plurality of users. For example, the server system sends the processed messages to the message distribution address that corresponds to a predetermined email server, SMS server, micro-blogging server, or mobile application messaging server.

In some embodiments, the server system receives (422) a plurality of responses, a respective response of the plurality of responses responding to a respective processed message of the plurality of processed messages. In some embodiments, the respective response is one of: open, click, view, view in mobile, forward-view, forward-send, share, subscribe, and unsubscribe. In some embodiments, an "open" response indicates that a user has opened a corresponding message (e.g., an email). In some embodiments, a "click" response indicates that a user has clicked a corresponding message. In some embodiments, a "view" response indicates that a user has viewed a corresponding message. In some embodiments, a "view in mobile" response indicates that a user has viewed a corresponding message using a mobile device ad/or in a mobile application. In some embodiments, "forward-view" and "forward-send" responses indicate that a user has forwarded a corresponding message. In some embodiments, a "shared" response indicates that a user has shared a corresponding message. In some embodiments, a "subscribe" response indicates that a user has subscribed to a mailing list associated with a corresponding message. In some embodiments, an "unsubscribe" response indicates that a user has unsubscribed from a mailing list associated with a corresponding message.

In some embodiments, the server system processes the plurality of responses in accordance with the message distribution information. For example, the server system extracts information identified in a predefined response configuration (e.g., a type of response, a message recipient, a timestamp, a message identifier, a template identifier, etc.). The server system stores a plurality of processed responses. In some embodiments, the processing includes determining whether the respective response corresponds to a standard event (e.g., bounce, open, and click), and converting the respective response in accordance with a determination that the respective response corresponds to a standard event.

In some embodiments, the server system receives the plurality of responses from the message distribution address. For example, a response from a client device is initially sent to a message distribution server, and the message distribution server located at the message distribution address forwards the response to the server system.

In some embodiments, the plurality of responses are (424) in a third format, and processing the plurality of responses in accordance with information in the message distribution information includes converting the plurality of responses into a fourth format that is distinct from the third format. In some embodiments, the third format is unique to a message distribution server corresponding to the message distribution address and the fourth format is generic to multiple message distribution servers. For example, the third format is a proprietary binary format and the fourth format is HTML or Extensible Markup Language (XML). A binary format may reduce a size of a message, thereby enabling efficient communication between the server system and the message distribution server. An XML format may be more efficient for parsing and storing the response in a database.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the underlying principles and their practical applications, to thereby enable others skilled in the art to best utilize the described principles and various embodiments with various modifications as are suited to the particular use contemplated.

The terminology used in the description of the embodiments herein is for the purpose of describing particular embodiments only and is not intended to be limiting of the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof.

It will also be understood that, although the terms first, second, etc. may be used herein to describe various elements, these elements should not be limited by these terms. These terms are only used to distinguish one element from another. For example, a first format could be termed a second format, and, similarly, a second format could be termed a first format, without departing from the underlying principles. The first format and the second format are both formats, but they are not the same format.

What is claimed is:

1. A method, comprising:
at a server system comprising one or more processors and memory:
receiving message distribution information, the message distribution information including a channel identifier and a message distribution address corresponding to one or more message distribution servers;
obtaining from a message queue of the server system a plurality of messages that correspond to the channel identifier, wherein the message queue includes the plurality of messages prior to the server system receiving the message distribution information, each message of the plurality of messages has a designed recipient, and the plurality of messages is for distribution to a plurality of users through the one or more message distribution servers;
processing the plurality of messages in accordance with the message distribution information; and
sending the plurality of processed messages to the message distribution address for distribution to the plurality of users through the one or more message distribution servers.

2. The method of claim 1, wherein the server system, in response to receiving the message distribution information, sends a request to retrieve from the message queue the plurality of messages that correspond to the channel identifier; and
wherein processing the plurality of messages includes:
coupling one or more adapters, of a plurality of adapters, to process the plurality of messages, wherein each adapter of the plurality of adapters includes at least one message distribution configuration, each message distribution configuration corresponding to a respective message distribution server of a plurality of message distribution servers and specifying a message format change and/or supplemental information to be added to messages to be sent via the respective message distribution server of the plurality of message distribution servers; and processing the plurality of messages with the one or more coupled adapters.

3. The method of claim 1, wherein timing of obtaining from the message queue the plurality of messages that correspond to the channel identifier is independent of receiving the message distribution information.

4. The method of claim 1, wherein the message distribution information includes a predefined distribution configuration that is configured for processing the plurality of messages.

5. The method of claim 4, wherein processing the plurality of messages in accordance with the predefined distribution configuration includes generating the plurality of processed messages by inserting predefined information in the predefined distribution configuration into each of the plurality of messages.

6. The method of claim 1, wherein the plurality of messages is in a first format, and processing the plurality of messages in accordance with the message distribution information includes converting the plurality of messages into a second format that is distinct from the first format.

7. The method of claim 1, further comprising:
receiving a plurality of responses, a respective response of the plurality of responses responding to a respective processed message of the plurality of processed messages;
processing the plurality of responses in accordance with the message distribution information; and
storing a plurality of processed responses.

8. The method of claim 7, wherein the plurality of responses are in a third format, and processing the plurality of responses in accordance with information in the message distribution information includes converting the plurality of responses into a fourth format that is distinct from the third format.

9. The method of claim 1, wherein the one or more message distribution servers are located remotely from the server system.

10. A server system, comprising:
one or more processors; and
memory storing one or more programs for execution by the one or more processors, the one or more programs including instructions for:
receiving message distribution information, the message distribution information including a channel identifier and a message distribution address corresponding to one or more message distribution servers;
obtaining from a message queue of the server system a plurality of messages that correspond to the channel identifier, wherein the message queue includes the plurality of messages prior to the server system receiving the message distribution information, each message of the plurality of messages has a designed recipient, and the plurality of messages is for distribution to a plurality of users through the one or more message distribution servers;
processing the plurality of messages in accordance with the message distribution information; and
sending the plurality of processed messages to the message distribution address for distribution to the plurality of users through the one or more message distribution servers.

11. The system of claim 10, wherein the one or more programs include instructions for, in response to receiving the message distribution information, sending a request to retrieve from the message queue the plurality of messages that correspond to the channel identifier; and
wherein processing the plurality of messages includes:
coupling one or more adapters, of a plurality of adapters, to process the plurality of messages, wherein each adapter of the plurality of adapters includes at least one message distribution configuration, each message distribution configuration corresponding to a respective message distribution server of a plurality of message distribution servers and specifying a message format change and/or supplemental information to be added to messages to be sent via the respective message distribution server of the plurality of message distribution servers; and
processing the plurality of messages with the one or more coupled adapters.

12. The system of claim 10, wherein timing of obtaining from the message queue the plurality of messages that correspond to the channel identifier is independent of receiving the message distribution information.

13. The system of claim 10, wherein the message distribution information includes a predefined distribution configuration that is configured for processing the plurality of messages.

14. The system of claim 13, wherein processing the plurality of messages in accordance with the predefined distribution configuration includes generating the plurality of processed messages by inserting predefined information in the predefined distribution configuration into each of the plurality of messages.

15. The system of claim 10, wherein the plurality of messages is in a first format, and processing the plurality of messages in accordance with the message distribution information includes converting the plurality of messages into a second format that is distinct from the first format.

16. The system of claim 10, wherein the one or more programs include instructions for:
receiving a plurality of responses, a respective response of the plurality of responses responding to a respective processed message of the plurality of processed messages;
processing the plurality of responses in accordance with the message distribution information; and
storing a plurality of processed responses.

17. The system of claim 16, wherein the plurality of responses are in a third format, and processing the plurality of responses in accordance with information in the message distribution information includes converting the plurality of responses into a fourth format that is distinct from the third format.

18. The system of claim 10, wherein the one or more message distribution servers are located remotely from the server system.

19. A non-transitory computer readable storage medium storing one or more programs for execution by one or more processors of a server system, the one or more programs including instructions for:
receiving message distribution information, the message distribution information including a channel identifier and a message distribution address corresponding to one or more message distribution servers;
obtaining from a message queue of the sever system a plurality of messages that correspond to the channel identifier, wherein the message queue includes the plurality of messages prior to the server system receiving the message distribution information, each message of the plurality of messages has a designed recipient, and the plurality of messages is for distribution to a plurality of users through the one or more message distribution servers;

processing the plurality of messages in accordance with the message distribution information; and sending the plurality of processed messages to the message distribution address for distribution to the plurality of users through the one or more message distribution servers.

20. The non-transitory computer readable storage medium of claim 19, wherein the one or more programs include instructions for, in response to receiving the message distribution information, sending a request to retrieve from the message queue the plurality of messages that correspond to the channel identifier; and wherein processing the plurality of messages includes:

coupling one or more adapters, of a plurality of adapters, to process the plurality of messages, wherein each adapter of the plurality of adapters includes at least one message distribution configuration, each message distribution configuration corresponding to a respective message distribution server of a plurality of message distribution servers and specifying a message format change and/or supplemental information to be added to messages to be sent via the respective message distribution server of the plurality of message distribution servers; and processing the plurality of messages with the one or more coupled adapters.

* * * * *